United States Patent Office 3,686,008
Patented Aug. 22, 1972

3,686,008
AQUEOUS HYDRAULIC CEMENT SLURRY
Hugh T. Harrison, Tulsa, and Korwin J. Goodwin, Enid, Okla., assignors to The Dow Chemical Company, Midland, Mich.
No Drawing. Original application July 29, 1968, Ser. No. 748,173, now Patent No. 3,605,898, dated Sept. 20, 1971. Divided and this application June 15, 1970, Ser. No. 57,426
Int. Cl. C04b 13/20
U.S. Cl. 106—92
5 Claims

ABSTRACT OF THE DISCLOSURE

An improved aqueous hydraulic cement slurry which may be retained in a pumpable fluid state for an indefinite time (and accordingly used as a well-drilling circulating fluid) by admixture therewith of a heptolactone, particularly D-gluco-D-guloheptolactone, and just prior to ultimate emplacement of the slurry containing the additive, admixing therewith a polyvalent metal salt accelerator to the setting rate, e.g. $CaCl_2$.

CROSS REFERENCE TO RELATED APPLICATION

This is a division of application Ser. No. 748,173, filed July 29, 1968, now U.S. Pat. No. 3,605,898, issued Sept. 20, 1971.

The invention relates to aqueous hydraulic cement slurries and to the use thereof.

Among the great number of uses for aqueous cement slurries which subsequently set to hard strong monolithic solids, there are some wherein intentional or unexpected delays occur. In such instances, it is highly desirable that the cement slurry not set to a solid until it has been emplaced at the locus where it is desired that it remain as a monolithic solid.

A mass of aqueous cement setting to a solid prematurely is a very disturbing situation and may easily constitute a climactic one. Cementing operations associated with oil field operations and particularly at the completion of drilling a well are of particular concern in regard to premature setting of the cement slurry. Useful fluids naturally occurring in the earth are procured, in all practical situations, by means of wells drilled down to the necessary depth, i.e. to the level of the fluid-bearing stratum. Drilling is usually conducted by a cutting bit attached to the lower end of a drill stem down which a drilling fluid is pumped and circulated out through holes provided in the bit for that purpose and up the annulus between the drill stem and the face of the formation, usually completing the return to ground level by a surface string of casing. These fluids carry up drilled rock chips, fragments, and shavings, plaster the face of the formation, provide pressure against intruding formation liquids, and cool and lubricate the bit. The drilling fluids usually contain suspended clay and are commonly called drilling muds. After a reservoir has been tapped in the earth and the drilling operation considered complete, at least for the time, final extensions of casing are run into the hole. The casing near the bottom thereof is then cemented into place and any encroaching brine or water substantially shut off by emplacing an aqueous settable hydraulic cement slurry near the lower end of the casing by which the casing is firmly bonded to the formation. Some disadvantages are ever present because of the necessity of changing over, according to known practices, from a clay-based drilling fluid to a hydraulic cement slurry.

One disadvantage of the change-over, i.e. from the drilling fluid comprising finely ground clay to an aqueous cement slurry, is due to the fact that the presence of any residual clay detracts from the efficacy of a cementing job employing conventional cements. A concomitant disadvantage of this necessary change-over, and therefore closely associated with that stated above, is the necessity, prior to cementing, of removing any adhering clay which had served as a protective sheath or plaster on the side of the hole during the drilling operation. Unless this sheath is substantially removed, good footing (i.e. bonding or adhesion of the cement to the face of the formation) is not attained. Any loose material or irregularity on the face of the formation tends to result in poor bonding. This presents a very definite problem and one which is not often completely overcome. Accordingly the quality of the cementing jobs often suffers as a result thereof.

Attempts have been made to provide a drilling fluid that could be, as need arises (e.g. upon completion of drilling a well), converted to a settable slurry which would solidify and thereby perform the function of securing casing in place and sealing off unwanted fluids similarly to that presently accomplished by the use of conventional hydraulic cement slurries.

In the more general use of cement slurries, there is also sometimes a need for retaining the slurry in a fluid state for prolonged periods of time, as for example, wherein a ready mixed cement slurry is prepared at a considerable distance from the place of usage, and accordingly, must be transported over such distances where water is scarce in the vicinity of the site, and/or where cement is prepared for use and due to unforeseen delays must be held in the fluid state until the cause of the delay is corrected.

The present invention attains these and related objectives. It provides a hydraulic cement slurry whose rate of setting can be sufficiently retarded to remain in a fluid pumpable stage for long periods of time as for example on a continuous conveyor belt, in a mixing truck, or in a borehole during a drilling operation as a drilling fluid and which cement slurry used as a drilling fluid subsequently can be caused to set to a high compressive strength solid by admixture therewith of an accelerator or setting agent.

The invention embodies, inter alia, an aqueous cement slurry comprising 100 parts of a hydraulic cement, from about 0.5 to about 5 parts of a heptolactone and from 35 to 65 parts of water. The term hydraulic cement refers to any water-hydratable, settable cement, prominent of which are portland, pozzolan, aluminous, and high sulfate expansive cements. By the term heptolactone is meant a 7-carbon atom ring sugar. The preferred heptolactone to employ in the practice of the invention is D-gluco-D-guloheptolactone. Methods of preparing D-gluco-D-guloheptolactone are known, e.g. as described in Organic Chemistry by Carl Karrer, 4th Edition, published by the Elsevier Publishing Company, Inc., New York (1949), particularly at page 347. Lactones may be prepared by known methods, e.g. as described in the Paul Karrer text, (ibid.) page 263 or in Organic Chemistry by Fleser and Fleser, 3rd Edition, published by Reinhold Publishing Corporation, New York (1956), pages 323 to 325, 358, 370 and 377 to 378.

D-gluco-D-guloheptolactone is considered to have the formula:

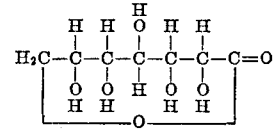

One commercial source thereof is the Aldrich Chemical Company, Milwaukee, Wis., U.S.A.

The invention also embodies a method of working a well comprising circulating in a wellbore the above composition and, at a time at which it is desired to cement in or plug off the well, admix with the composition a water-soluble di- or polyvalent metal salt or mixture thereof and emplace the thus altered or modified composition in the wellbore at a locus where such cementing or plugging is desired, and allow the so emplaced modified composition to remain substantially undisturbed for at least about 2 hours whereby the composition sets to a strong substantially fluid-tight monolithic solid mass. Soluble salts of calcium, magnesium, iron, aluminum, strontium, and/or zirconium are illustrative as an accelerator to setting of the cement slurry.

Because of its availability and low cost and because of its superior performance, however, calcium salts are employed in the examples hereinafter presented. However, other salts (although performing in a less effective manner) having similar characteristics may be used in the practice of the invention.

To prepare the slurry of the invention, the selected heptolactone is admixed with water and a hydraulic cement. The order of mixing is unimportant. Other ingredients known to be useful to impart other desired properties to such a slurry than that provided by the lactone, to meet particular needs, also may be admixed therewith. Illustrative of such additional ingredients are turbulence inducers, of which bisethylenepyrophosphate-urea pyrolysis product, as described in co-pending application S.N. 628,253, filed Apr. 4, 1967, now U.S. Pat. No. 3,409,080 or S.N. 480,794, filed Aug. 5, 1965, abandoned, is effective. Other such ingredients are polystyrene sulfonate and polyvinyltoluene sulfonate which are useful for the purpose of inhibiting loss of liquid to a porous formation during the setting period. Sand or gravel may also be present if it is desired or deemed necessary as is the case of many construction cementing jobs although seldom used in well cementing jobs.

The aqueous cement slurry of the invention is converted to a settable composition, when desired, by admixture therewith of a di- or polyvalent metal salt, of which $CaCl_2$ is preferred.

The method of the invention employing the composition of the invention, for use as a drilling fluid which can be subsequently converted to a settable cement to "cement in" the well is conducted by circulating the slurry as described above, prior to admixture of the salt therewith, down the drill stem, out the bit and up the annulus and into a sump pit at ground level (where a large proportion of the bit shavings and chips settle out). A properly located sump pump draws additional fluid at a suitable level of the sump pit (some distance above the bottom) back into the drill stem for recirculation. When the drilling operation has been fully completed, the salt, usually $CaCl_2$, is admixed with the slurry at the wellhead. The thus treated composition is then emplaced, as in conventional cementing, at the level where the cement is desired to set. The overflow, i.e. any returned or recirculated settable cement slurry, after addition of the $CaCl_2$ or other setting agent in accordance with the invention may be directed, if desired, to a separate pit so that the sump pit itself will not solidify.

The amount of the heptolactone may be employed in an amount of between about 0.5 and 5.0 parts and is usually employed in the invention between about 0.75 and 1.5 parts per hundred parts by weight of dry cement. The polyvalent metal salt may be employed in the amount of between about 1 and 10 parts depending on conditions, e.g. temperature, length of set time desired, and the like. Between about 5 and about 6 parts of the salt are usually employed. The hydraulic cements which may be used in the invention include any of the known hydraulic cements, e.g. Classes A, B, C, D, E, F, and G set out on page 3 of API RF 10B, 14th Edition (March 1965) page 2. As aforesaid, cements useful in the invention also include pozzolan cements which usually employ fly ash and/or volcanic ash in the manufacture thereof, or aluminous cements, and high sulfate expansive cements, e.g. as described in patent application S.N. 271,755, filed June 1, 1964, by R. C. Martin.

Class A cement is most commonly used for the usual well cementing job unless unusual temperatures or conditions are present. Accordingly Class A cement was used in the following comparative tests and examples of the invention.

Various starches, sugars, organic acids and salts, gelatins, and proteins were employed with cement and water to ascertain the retardant effect, if any.

The tests were conducted as follows:

400 grams of Class A cement and 184 milliliters of distilled water, which amounts are equivalent to about 100 parts of cement and 46 parts of water by weight, were employed. Mixing was done in accordance with the procedure set out in Section Two, pages 5 and 6, of the cited API publication. Immediately after mixing, the viscosity of each slurry was obtained by using a Fann Model 35V-G meter. The viscosity is ascertained by calculating the coefficient of rigidity (designated $n$) and yield value (designated $ty$) from the Fann viscometer values by the prescribed procedure of the Fann Instrument Corporation, 3202 Argonne, Houston, Texas. The coefficient of rigidity is expressed in pounds per second-foot and tensile value is expressed in pounds per second-foot. To determine these values by the use of the viscometer, the cement is dry mixed and the dry cement then made into a slurry, employing the procedure and proportions of cement and water specified in Section 2, Table 2.2 of API RP 10B, i.e. 46 parts of water per 100 parts of dry cement by weight. The slurry so made is immediately transferred to the Fann sample cup. The instrument reading of the Fann viscometer is then ascertained at a speed of 600 revolutions per minute (r.p.m.). After the reading has become stabilized at the 600 r.p.m. speed, the instrument is adjusted to 300 r.p.m. and the reading again recorded after the value becomes stabilized at that speed. The rigidity ($n$) and the yield value ($ty$) are calculated as follows:

$$n = N \text{ (600 reading} - 300 \text{ reading)} (0.000672)$$

$$ty = N \frac{[300 \text{ reading} - (600 \text{ reading} - 300 \text{ reading})]}{100}$$

N=in the above equations is the extension factor of the torque spring of the instrument. This is a value for each instrument and is a part of the direction for use of the instrument obtainable from the Fann Company.

Each slurry was thereafter poured into a 1-quart glass jar which was then capped and placed, and maintained immersed, in a 100° F. constant-temperature bath. Periodically, each jar was removed and the contents examined. When the slurry had become extremely thick, i.e. had reached a gel or setting stage, at which it was no longer pumpable, it was discarded. After 25 days of continuous immersion in the bath, only two samples (those identified as Tests No. 16 and 17) remained fluid and pumpable and were considered acceptable.

Thereafter Sample 16, one of those remaining fluid, was divided into 3 equal sized portions of 160 grams each, poured into suitable mixing containers, and a selected setting agent admixed therewith. The slurry containing the setting agent was transferred into separate 4-dram size glass cylindrical vials. The vials were then capped and a hole drilled in each cap to release any possible pressure build-up during the subsequent test. Each vial was tapped approximately ten times to aid in the removal of any entrapped air. The three vials were then placed in the 100° F. temperature bath and the length of time necessary for complete set to a satisfactory solid observed. After 8 days, the vials were then removed, struck with a light weight hammer so as to break them and the broken glass places of the vial removed, leaving the set cement sample intact. The set cement sample was then sawed in two to provide smooth cut cylindrical faces which were substantially parallel. The samples were then tested in a Tinius Olson Testing Machine in accordance with the recommended practice for the machine to determine the compressive strength values of the samples. The compressive strength values in p.s.i. are obtained by reading the Tinius Olson indicator and multiplying the reading by a factor of 1.46, as recommended by the manufacturers of the tester.

The results are shown in tabulated form in Tables I to III which follow:

Comparison of various possible retardants with a glucoheptone was made by admixture therewith of 100 parts of portland cement and 46 parts of deionized water.

TABLE I

| Test Number: | Additive in percent by dry weight of cement | Additive |
|---|---|---|
| 1 | 1 | Sucrose. |
| 2 | 5 | Do. |
| 3 | 10 | Do. |
| 4 | 1 | Corn starch. |
| 5 | 5 | Do. |
| 6 | 5 | Polysaccharide B-1459. |
| 7 | 1 | Gelatine. |
| 8 | 5 | Do. |
| 9 | 5 | Zein A. |
| 10 | 5 | Lignin. |
| 11 | 5 | Soy flour. |
| 12 | 1 | Lactose. |
| 13 | 1 | Dextrose. |
| 14 | 1 | Delta-glucolactone. |
| 15 | 5 | Do. |
| 16 | 1 | 2-D-gluco-D-guloheptolactone. |
| 17 | 5 | Do. |

TABLE II

[Viscosity values, of samples of Test 16 obtained by means of Fann Model 35V-G meter]

| Sample identification | $n$ value | $ty$ value |
|---|---|---|
| 16 initial | 0.0161 | 0.19 |
| 16, A after 25 days | 0.0114 | 0.21 |

TABLE III

[Compressive strength values of portions of Sample 16 after aging 25 days, to which were subsequently added $CaCl_2$ as an accelerator to set, and the samples allowed to age for 8 days]

| Sample identification | Amount of $CaCl_2$ by weight of cement present | Compressive strength in p.s.i. |
|---|---|---|
| 16, B | 3.65 plus 3.65% $CrO_3$ | 2,215 (average of 3 tests). |
| 16, B | 7.3 | 5,275 (average of 2 tests). |

Reference to Tables I to III shows that only the D-gluco-D-guloheptolactone satisfactorily retarded the setting of the aqueous cement slurry. Other materials, indicating a possibility of behaving in an aqueous cement slurry in a similar manner, failed. The tables also show that the cement slurry so retarded can be accelerated to set in a very acceptable time by admixture therewith of $CaCl_2$. Table III shows that $CaCl_2$ is more effective in producing high compressive strength when used alone than when mixed with $CrO_3$. They also show that the cement when so set has good compressive strength. The tests of the tables also show that the D-gluco-D-guloheptolactone may be employed in an amount of between about 0.5 and 5.0 parts on a dry weight basis per 100 parts of cement present and that $CaCl_2$ may be employed in an amount of between about 1 and 10 parts per 100 parts of cement present to effectuate a good set rate.

The following example illustrates the practice of the invention wherein a well is drilled employing the cement slurry of the invention and upon completion of drilling, is subsequently cemented in by accelerating the setting of the cement.

FIELD EXAMPLE

To drill and then later cement a well in a field, the following procedure is illustrative of the practice of the invention. The amounts set forth below prepare approximately 1,000 gallons of the aqueous drilling fluid convertible subsequently, to the cement composition of the invention.

4650 pounds of water are placed in a suitable mixing tank. 116.5 pounds of D-gluco-D-gulohheptolactone (1.0% by weight of the dry cement to be used) are admixed with the water and 11,650 pounds of an API class A cement are admixed with the aqueous solution of the D-gluco-D-guloheptolactone and mixing continued until an aqueous composition of substantial homogeneity is made. After thoroughly mixing the composition by means of the mud pumps, drilling of the well is commenced and the composition of the invention is circulated through the well by the mud pumps in the same manner as conventional drilling muds. As the well drilling operation progresses samples of the fluid composition are tested to determine the liquid and solids content. Any water lost to the formation, or lost by evaporation from the mud pits, is replaced to insure against undue increases in viscosity because of increased solids content. Drilling is continued without interruption until a depth of approximately 2000 feet is reached at which point the well drilling is completed and is to be cemented.

582.5 pounds of $CaCl_2$, about 5% by weight of the cement solids, are added to 600 pounds of water at 85° F. and mixing is continued until all solids are in solution. The resulting $CaCl_2$ brine solution is added to the drilling fluid composition of the invention, which is contained in the mud pit, and the mud pumps are operated for 1 hour to circulate all of the drilling fluid throughout the wellbore and mud pits, thereby insuring complete and intimate mixing of the cementitious fluid composition and the $CaCl_2$ accelerator solution. The composition thus prepared is pumped or otherwise forced down the wellbore to the level where the cementing is desired to be done. Cementing equipment, including pumps, packers, or plugs are employed in the practice of the invention in a similar manner to conventional cementing operations. The aqueous composition, after being emplaced in the well, is allowed to stand for a time sufficient for it to become a hard monolithic solid. The length of time necessary for the composition to remain undisturbed, according to practice, may be as little as 24 hours.

Having described our invention, what we claim and desire to protect by Letters Patent is:

1. A fluid composition of matter consisting essentially of, by weight, 100 parts of a hydraulic cement, between about 30 and about 65 parts of water, and between about 0.75 and 5.0 parts of D-gluco-D-guloheptolactone.

2. The composition of claim 1 wherein the D-gluco-D-guloheptolactone is present in an amount of between 0.5 and 4.0 parts per 100 parts by weight of cement.

3. The composition of claim 1 with which is admixed a fluid-loss control agent, to inhibit loss of fluid to a geologic formation while the composition is in contact therewith, in an amount of between about 0.1 and 2.0 parts per 100 parts by weight of cement.

4. The composition of claim 1 wherein the fluid composition includes in addition admixed with the fluid composition between about 1 and about 10 parts of a water-soluble polyvalent metal salt per 100 parts by dry weight of cement present.

5. The composition of claim 4 wherein the polyvalent metal salt is CaCl$_2$.

References Cited
UNITED STATES PATENTS

| | | | |
|---|---|---|---|
| 3,432,317 | 3/1969 | Kelly et al. | 106—92 |
| 3,351,478 | 11/1967 | Dodson et al. | 106—90 |
| 3,413,344 | 11/1968 | Quigley | 106—90 |
| 3,234,154 | 2/1966 | Martin | 106—90 |
| 3,100,526 | 8/1963 | Martin | 106—90 |
| 2,880,102 | 3/1959 | Woodard et al. | 106—90 |
| 2,648,645 | 8/1953 | Boris et al. | 106—92 |

TOBIAS E. LEVOW, Primary Examiner

W. T. SCOTT, Assistant Examiner

U.S. Cl. X.R.

106—90, 315